United States Patent
Downum et al.

(10) Patent No.: US 10,120,678 B2
(45) Date of Patent: Nov. 6, 2018

(54) FIRMWARE UPDATE CONTROL MECHANISM USING ORGANIZATIONAL GROUPS

(71) Applicant: Dell Products, L.P., Round Rock, TX (US)

(72) Inventors: Steven Downum, Pflugerville, TX (US); Walter Phillips, Georgetown, TX (US); Balasingh Samuel, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 4 days.

(21) Appl. No.: 15/352,356

(22) Filed: Nov. 15, 2016

(65) Prior Publication Data

US 2018/0136928 A1 May 17, 2018

(51) Int. Cl.
*G06F 9/44* (2018.01)
*G06F 8/654* (2018.01)
*H04L 29/06* (2006.01)

(52) U.S. Cl.
CPC .............. *G06F 8/654* (2018.02); *H04L 63/08* (2013.01)

(58) Field of Classification Search
CPC ..................................... G06F 8/65; G06F 8/61
USPC .................................. 717/168, 172, 173, 177
See application file for complete search history.

(56) References Cited

U.S. PATENT DOCUMENTS

| | | | | |
|---|---|---|---|---|
| 9,658,843 | B2* | 5/2017 | Nishikawa | G06F 8/65 |
| 2007/0250830 | A1* | 10/2007 | Holmberg | G06F 8/65 |
| | | | | 717/171 |
| 2008/0053698 | A1* | 3/2008 | Purves | H01R 9/24 |
| | | | | 174/520 |
| 2008/0109540 | A1* | 5/2008 | Rogers | G06F 8/61 |
| | | | | 709/222 |
| 2010/0005462 | A1* | 1/2010 | Ookuma | G06F 8/65 |
| | | | | 717/177 |
| 2011/0072423 | A1* | 3/2011 | Fukata | G06F 8/65 |
| | | | | 717/172 |
| 2011/0276956 | A1* | 11/2011 | Yuki | G06F 8/65 |
| | | | | 717/170 |
| 2013/0151583 | A1* | 6/2013 | O'Connor | G06Q 20/34 |
| | | | | 709/202 |
| 2013/0194604 | A1* | 8/2013 | Asano | G06F 3/1229 |
| | | | | 358/1.13 |

(Continued)

*Primary Examiner* — Phillip H Nguyen
(74) *Attorney, Agent, or Firm* — Fogarty LLP

(57) ABSTRACT

System and methods are provided for distributing firmware updates to groups of IHSs (Information Handling Systems) managed by an organization. The organization managing the IHSs specifies categorizations for each IHS that are used to separate the managed IHSs into firmware update groups. A GUID (Global Unique Identifier) is assigned to each IHS, in some scenarios during the manufacture of the IHS. The assigned GUID specifies one or more firmware update groups to which an IHS has been assigned. The organization, or other technical support entity, utilizes a firmware distribution system for delivery of firmware updates to supported IHSs. The organization signals the delivery of updates to a firmware update group by specifying the group's GUID to the firmware distribution service. The IHS, identified by its assigned GUID, queries a firmware distribution services in order to determine whether new firmware updates have been made available to its assigned firmware update group.

20 Claims, 6 Drawing Sheets

(56) References Cited

U.S. PATENT DOCUMENTS

| | | | |
|---|---|---|---|
| 2013/0305237 A1* | 11/2013 | Eisenhauer | G06F 8/65 717/172 |
| 2013/0346796 A1* | 12/2013 | Niwa | G06F 11/1433 714/15 |
| 2014/0020105 A1* | 1/2014 | Nix | G06F 21/10 726/26 |
| 2014/0130028 A1* | 5/2014 | Maeda | G06F 8/71 717/170 |
| 2015/0205597 A1* | 7/2015 | Nishikawa | G06F 21/51 717/170 |
| 2018/0018161 A1* | 1/2018 | Gattu | G06F 8/656 |

* cited by examiner

FIRMWARE UPDATE CONTROL MECHANISM USING ORGANIZATIONAL GROUPS

FIELD

This disclosure relates generally to firmware updates, and more specifically, to systems and methods for updating the firmware utilized within Information Handling Systems (IHSs).

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

An IHS is typically comprised of hardware components that utilize firmware instructions for governing the operation of these hardware components. The firmware instructions for a hardware component are typically stored in a non-volatile memory that is integral to the hardware component. In certain scenarios, the firmware utilized by a hardware component may be updated in order to correct errors in and/or improve the performance of the hardware component. In certain networked environments, the firmware for a hardware component may be updated remotely. For instance, a system administrator, or an automated script configured by an administrator, may be used to push firmware updates to the hardware component and initiate updating of the firmware.

In many cases, networks comprised of relatively large numbers of IHSs are managed by organizations that utilize IT (Information Technology) policies for governing the administration of the network and the IHSs that comprise the network. Some of these IT policies may govern the updating of hardware and/or software on the IHSs that are being managed. In certain scenarios, especially where larger networks of IHSs are being managed, IT policies may restrict the updating of software utilized by an IHS and, in some cases, different restrictions may be placed on updating different types of software. For instance, IT policies may be relatively liberal in allowing updates to the operating system software of an IHS or updating application software installed on an IHS, but may severely restrict the updating of firmware present on an IHS.

As described, firmware provides an interface between the operating system of an IHS and a hardware component. By updating the firmware of a hardware component, the operation of a component is typically affected. In some cases, these changes to the operation of a hardware component may include undesirable side-effects. For instance, IHSs may include or interface with important legacy systems that are incompatible with certain upgrades to the firmware of an IHS hardware component. Accordingly, organizations may prefer to defer certain firmware updates in order to maintain such legacy functionality. In some cases, such firmware updates may be deferred until a corresponding update can be made to the legacy system. Different organizations will implement different policies for updating firmware that are particular to the business purposes that are served by the IHSs.

One particular type of firmware that may be utilized by an IHS is the firmware that is utilized by the BIOS (Basic Input/Output System) of the IHS. An IHS typically includes at least one central processing unit (CPU), a system memory, such as a non-volatile memory or a flash memory, associated with the CPU, and a storage device such as a hard disk, floppy disk or CD-ROM. The BIOS firmware is typically stored in this system memory of an IHS. When an IHS is powered on, or "booted," the BIOS is initialized. The BIOS then verifies that all hardware components of the IHS are functional. The BIOS subsequently loads a stored operating system. The BIOS also provides data and instructions that enable the operating system to interoperate with the hardware components that are installed on the IHS. The Unified Extensible Firmware Interface (UEFI) was designed as a successor to conventional BIOS, aiming to address certain technical shortcomings. Newer IHSs predominantly utilize UEFI firmware instead of a BIOS. For the purposes of this disclosure, UEFI and BIOS may be treated interchangeably.

As with other firmware, in certain instances, it may be desirable to update the BIOS of an IHS. For example, the system BIOS may be updated in order to utilize new BIOS features that have become available. Or, the BIOS may be updated in order to support the installation of new hardware on an IHS. Updating the BIOS may also necessary if problems with the system BIOS are detected. However, even more than other firmware, changes to the BIOS of an IHS can have significant ramifications with regards to the operation IHS. For instance, changes to the BIOS may result in significant changes with regard to hardware compatibility. Due at least in part to the potential impact of a change to the BIOS, organizations managing large numbers of IHSs may severely restrict BIOS updates. In certain instances, organization may prefer to delay BIOS firmware updates until any compatibility or other issues associated with the upgrade have been resolved.

Different organization utilizing different types of hardware and/or software may have different preferences and policies for updating BIOS firmware. For instance, an organization using mostly off-the-shelf hardware and software components may have no need to defer any BIOS upgrades, while another organization using customized components may upgrade the BIOS only after verifying compatibility. Additionally, organizations may also prefer to delay certain firmware upgrades for certain groups of IHSs that are being managed. For instance, an organization may utilize both off-the-shelf IHSs and customized IHSs for which firmware upgrades may be managed according to different policies.

SUMMARY

Described herein are embodiments of systems and methods for distributing firmware updates to a groups of IHSs managed by an organization. In an illustrative, non-limiting embodiment, a system includes one or more processors and a memory device coupled to the one or more processor, the memory device storing computer-readable instructions that, upon execution by the one or more processors cause the system to receive a categorization for a plurality of IHSs (Information Handling Systems), wherein the categorization is received from an organization that manages the plurality of IHSs; generate a GUID (Global Unique Identifier) based on the received categorization, wherein the GUID identifies each of the plurality of IHSs as a member of a firmware update group; encode each of the plurality of IHSs with the generated GUID, wherein the GUID is encoded during the manufacture of each of the plurality of IHSs; and post one or more updated firmware programs to a firmware distribution service for delivery to each of the plurality of IHSs, wherein the one or more updated firmware programs are routed to each of the plurality of IHSs based on the GUID.

In certain implementations of the system, the categorization of the plurality of IHSs indicates that firmware updates are to be administered uniformly by each of each of the plurality of IHSs. In certain additional implementations of the system, each of the plurality of IHSs operates using the same version a BIOS (Basic Input/Output System) firmware program. In certain additional implementations of the system, the one or more firmware programs comprise an update to the BIOS firmware of each of the plurality of IHSs.

In certain additional implementations of the system, the memory device stores additional computer-readable instructions that, upon execution by the one or more processors, further cause the system to receive a request to modify the categorization of one or more of the plurality of IHSs; determine a second GUID based on the received modification, wherein the second GUID is associated with a second categorization of IHSs managed by the organization; establish a secure connection to each of the plurality of IHSs; and encode each of the plurality of IHSs with the second GUID. In certain additional implementations of the system, the second GUID is retrieved from a repository of GUIDs based on the modified categorization matching the second categorization, and wherein the second GUID identifies a second plurality of IHSs as members of a second firmware update group.

In certain additional implementations of the system, the memory device store additional computer-readable instructions that, upon execution by the one or more processors, further cause the system to determine whether to deliver one or more firmware updates to each of the plurality of IHSs, wherein the determination is made based on the version of the BIOS utilized by each of the plurality of IHSs. In certain additional implementations of the system, each of the plurality of IHSs is encoded with the GUID by editing the registry of each of the plurality of IHSs. In certain additional implementations of the system, the categorization of the plurality of IHSs is specified in an order for the manufacture of the plurality of IHSs.

In certain additional implementations of the system, the memory device stores additional computer-readable instructions that, upon execution by the one or more processors, further cause the system to receive a third categorization for a third plurality of IHSs, wherein the categorization is received from the organization and wherein the organization further manages the third plurality of IHSs; generate a third GUID based on the received categorization, wherein the third GUID identifies each of the third plurality of IHSs as a member of a third firmware update group; encode each of the third plurality of IHSs with the generated third GUID, wherein the third GUID is encoded during the manufacture of each of the third plurality of IHSs; and post one or more additional updated firmware programs to a firmware distribution service for delivery to each of the third plurality of IHSs, wherein the one or more additional updated firmware programs are routed to each of the third plurality of IHSs based on the third GUID.

In another illustrative, non-limiting embodiment, a method for distributing firmware updates includes receiving a categorization for a plurality of IHSs (Information Handling Systems), wherein the categorization is received from an organization that manages the plurality of IHSs; generating a GUID (Global Unique Identifier) based on the received categorization, wherein the GUID identifies each of the plurality of IHSs as a member of a firmware update group; encoding each of the plurality of IHSs with the generated GUID, wherein the GUID is encoded during the manufacture of each of the plurality of IHSs; and posting one or more updated firmware programs to a firmware distribution service for delivery to each of the plurality of IHSs, wherein the one or more updated firmware programs are routed to each of the plurality of IHSs based on the GUID.

In certain implementations of the method, the categorization of the plurality of IHSs indicates that firmware updates are to be administered uniformly by each of each of the plurality of IHSs. In certain additional implementations of the method, each of the plurality of IHSs operates using the same version a BIOS (Basic Input/Output System) firmware program. In certain additional implementations of the method, the one or more firmware programs comprise an update to the BIOS firmware of each of the plurality of IHSs.

In certain additional implementations, the method further includes receiving a request to modify the categorization of one or more of the plurality of IHSs; determining a second GUID based on the received modification, wherein the second GUID is associated with a second categorization of IHSs managed by the organization; establishing a secure connection to each of the plurality of IHSs; and encoding each of the plurality of IHSs with the second GUID. In certain additional implementations of the method, the second GUID is retrieved from a repository of GUIDs based on the modified categorization matching the second categorization, and wherein the second GUID identifies a second plurality of IHSs as members of a second firmware update group.

In certain additional implementations, the method further includes determining whether to deliver one or more firmware updates to each of the plurality of IHSs, wherein the determination is made based on the version of the BIOS utilized by each of the plurality of IHSs. In certain additional implementations of the method, each of the plurality of IHSs is encoded with the GUID by editing the registry of each of the plurality of IHSs. In certain additional implementations of the method, the categorization of the plurality of IHSs is specified in an order for the manufacture of the plurality of IHSs.

In certain additional implementations, the method further includes receiving a third categorization for a third plurality of IHSs, wherein the categorization is received from the organization and wherein the organization further manages the third plurality of IHSs; generating a third GUID based on the received categorization, wherein the third GUID identifies each of the third plurality of IHSs as a member of a third firmware update group; encoding each of the third plurality of IHSs with the generated third GUID, wherein the third GUID is encoded during the manufacture of each of the third plurality of IHSs; and posting one or more additional updated firmware programs to a firmware distribution service for delivery to each of the third plurality of IHSs, wherein the one or more additional updated firmware programs are routed to each of the third plurality of IHSs based on the third GUID.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Figure 1:
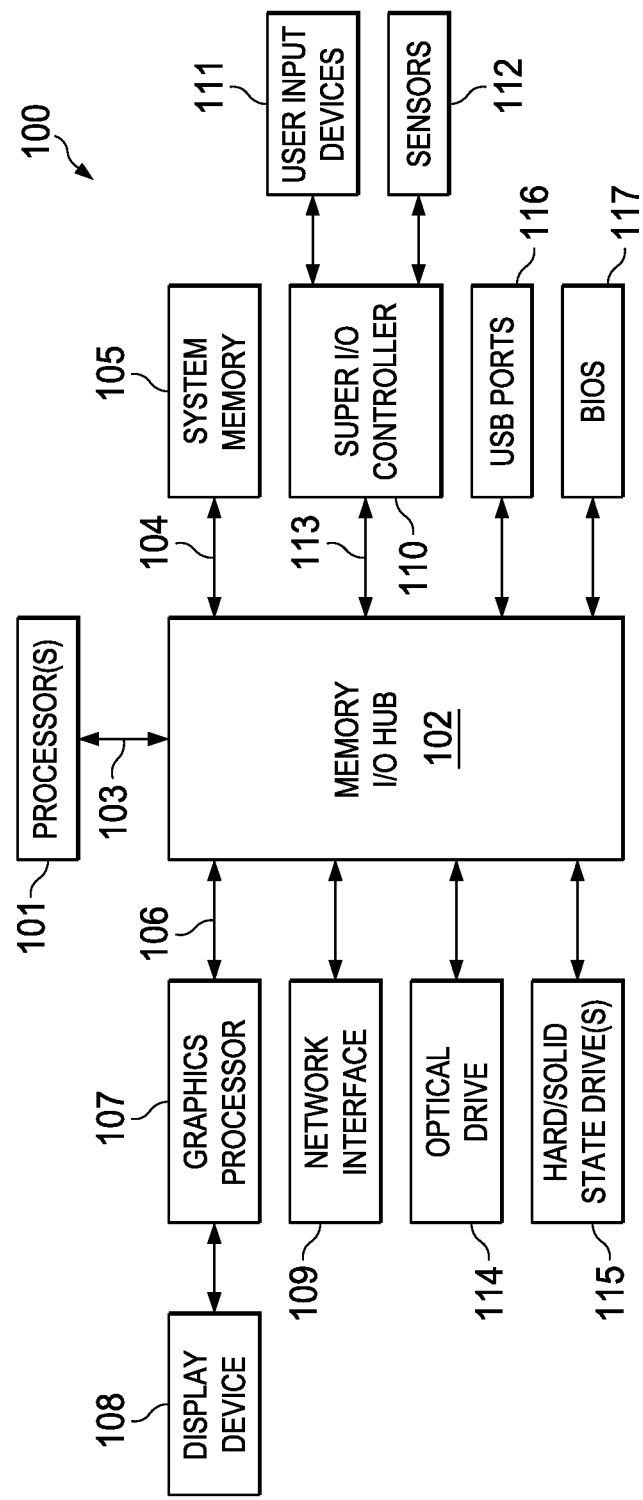
FIG. 1 is a block diagram of an example of an IHS configured to implement systems and methods for distributing firmware updates according to some embodiments.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain embodiments described herein may be discussed in the context of a server computer or personal computer, other embodiments may be utilized. In this example, the IHS is configured to distribute firmware updates, as explained in more detail below.

FIG. 1 is a block diagram of an IHS 100 configured according to certain embodiments to distribute firmware updates. IHS 100 may include one or more processors 101. In various embodiments, IHS 100 may be a single-processor system including one processor 101, or a multi-processor system including two or more processors 101. Processor(s) 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

IHS 100 includes a memory I/O hub chipset 102 comprising one or more integrated circuits that connect to processor(s) 101 over a front-side bus 103. Memory I/O hub 102 provides the processor(s) 101 with access to a variety of resources. For instance, memory I/O hub 102 provides access to system memory 105 over memory bus 104. System memory 105 may be configured to store program instructions and/or data accessible by processors(s) 101. In various embodiments, system memory 105 may be implemented using any suitable memory technology, such as static RAM (SRAM), synchronous dynamic RAM (SDRAM), nonvolatile/Flash-type memory, or any other type of memory.

Memory I/O hub 102 may also provide access to a graphics processor 107. In certain embodiments, graphics processor 107 may be comprised within one or more video or graphics cards that have been installed on IHS 100. Graphics processor 107 may be coupled to the memory I/O hub 102 via a graphics bus 106 such as provided an AGP (Accelerated Graphics Port) bus or a PCI (Peripheral Component Interconnect or) bus. In certain embodiments, graphics processor 107 generates display signals and provides them to a coupled display device 108.

In certain embodiments, memory I/O hub 102 may also provide access to one or more user input devices 111. In such embodiments, memory I/O hub 102 may be coupled to a super I/O controller 110 that provides interfaces for variety of user input devices 111, in particular lower bandwidth and low data rate devices. For instance, super I/O controller 110 may provide access to a keyboard and mouse or other peripheral input devices. In certain embodiments, super I/O controller 110 may be used to interface with coupled user input devices 111 such as keypads, biometric scanning devices, and voice or optical recognition devices. In certain embodiments, super I/O controller 110 may also provide an interface for communication with one or more sensor devices 112, which may include environment sensors, such as a temperature sensor or other cooling system sensor. The I/O devices, such as the user input devices 111 and the sensor devices 112, may interface super I/O controller 110 through wired or wireless connections. In certain embodiments, the super I/O controller 110 may be coupled to the super I/O controller 110 via a Low Pin Count (LPC) bus 113.

Other resources may also be coupled to IHS 100 through the memory I/O hub 102. In certain embodiments, memory I/O hub 102 may be coupled to a network interface 109, such as provided by a Network Interface Controller (NIC). According to various embodiments, network interface 109 may support communication via various wired and/or wireless networks. Memory I/O hub 102 may also provide access to one or more hard disk and/or solid state drives 115. In certain embodiments, access may be provided to an optical drive 114 or other removable-media drive. Any or all of the drive devices 114 and 115 may be integral to the IHS 100, or may be located remotely from the IHS 100. In certain embodiments, access may be provided to one or more Universal Serial Bus (USB) ports 116.

Another resource that may be accessed by processor(s) 101 via memory I/O hub 102 is BIOS 117. The BIOS 117 provides an abstraction layer for interfacing with certain hardware components that are utilized by IHS 100. Via this hardware abstraction layer provided by BIOS 117, the software executed by the processor(s) 101 of IHS is able to interface with certain I/O devices that are coupled to the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI. Upon booting of the IHS 100, processor(s) 101 may utilize BIOS 117 instructions to initialize and test hardware components coupled to the IHS and to load an Operating System (OS) for use by the IHS 100.

Not all IHSs 100 include each of the components shown in FIG. 1, and other components not shown may exist. Furthermore, some components shown as separate may exist in an integrated package or be integrated in a common integrated circuit with other components. For example, various of the resources provided via memory I/O hub 102 may instead be integrated into the one or more processor(s) 101 as a systems-on-a-chip.

Figure 2:
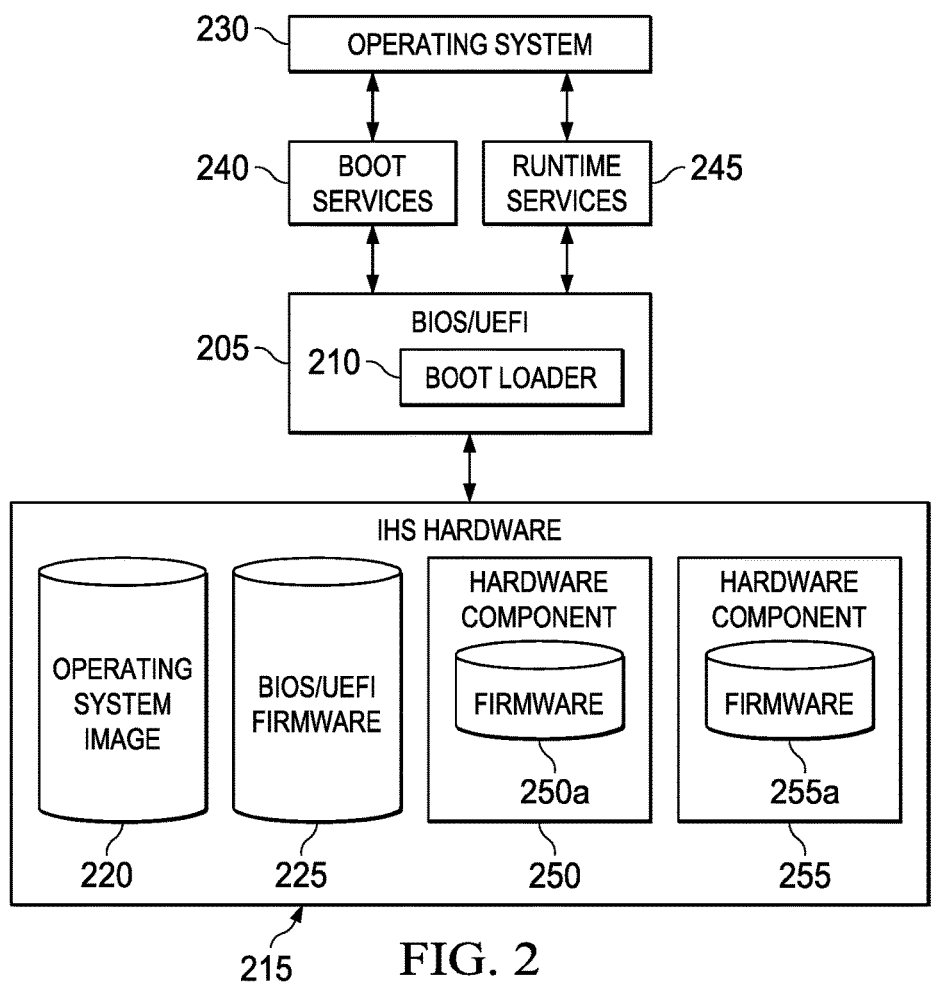
FIG. 2 is a block diagram depicting certain aspects of the operation of a BIOS in an IHS.

FIG. 2 illustrates certain aspects of the operation of BIOS 117 that is described above with respect to the IHS of FIG. 1. In particular FIG. 2 illustrates the initialization and operation of BIOS 205. Upon being powered, an IHS accesses the BIOS firmware 225 that is stored in memory, such as the system memory accessible to the processor(s) of the IHS. The BIOS firmware 225 is used by an IHS to initialize the BIOS process 205. As described with respect to FIG. 1, the BIOS of an IHS provides instructions that are utilized to interface with certain of the IHS hardware components 215 that are coupled to an IHS. The individual hardware components 215 may be coupled to the IHS via a range of techniques, ranging from fixed integrated circuits to ad hoc wireless connections. In the illustrated example, four hardware components 220, 225, 250, 255 are discussed. Other IHSs may have various other combinations of hardware components.

As described above with respect to FIG. 1, an IHS may utilize a memory I/O hub in order to access various resources, including system memory and one or more storage drives, such as hard disk drives. Upon being initialized, BIOS 205 utilizes a boot loader 210 that is configured to identify and boot an operating system for use by the IHS. The boot loader 210 utilizes the memory I/O hub to access an operating system image 220 that is stored in a storage device, such as a hard disk drive, that is coupled to the IHS. In certain scenarios, the boot loader 210 may be configured to load only certain modules of the operating system image 220. In certain scenarios, the boot loader 210 may also initialize a boot services process 240 that is configured to provide the basic I/O and file operations that are needed to boot the operating system 230. Once the operating system 230 is booted and properly configured to interface with the IHS hardware components 215, BIOS 205 may be configured to transition from the use of boot services 240 used during booting to runtime services 245 that are configured to provide instructions for I/O and file operations to be utilized by the booted operating system 230. In certain scenarios, various combinations of EFI and BIOS modules may be present in the BIOS 205. In such scenarios, an IHS may support various combinations features from of each of the EFI and BIOS firmware interfaces.

Referring back to FIG. 2, two additional hardware components 250 and 255 are illustrated. Each of these two hardware components 250, 255 include integral memory devices that are used to store firmware 250a, 255a that is configured to allow each of the respective hardware components 250, 255 to interface with the operating system 230.

As described above, the firmware for the hardware components 250a, 255a and the firmware for BIOS 225 may be occasionally updated.

Figure 3:
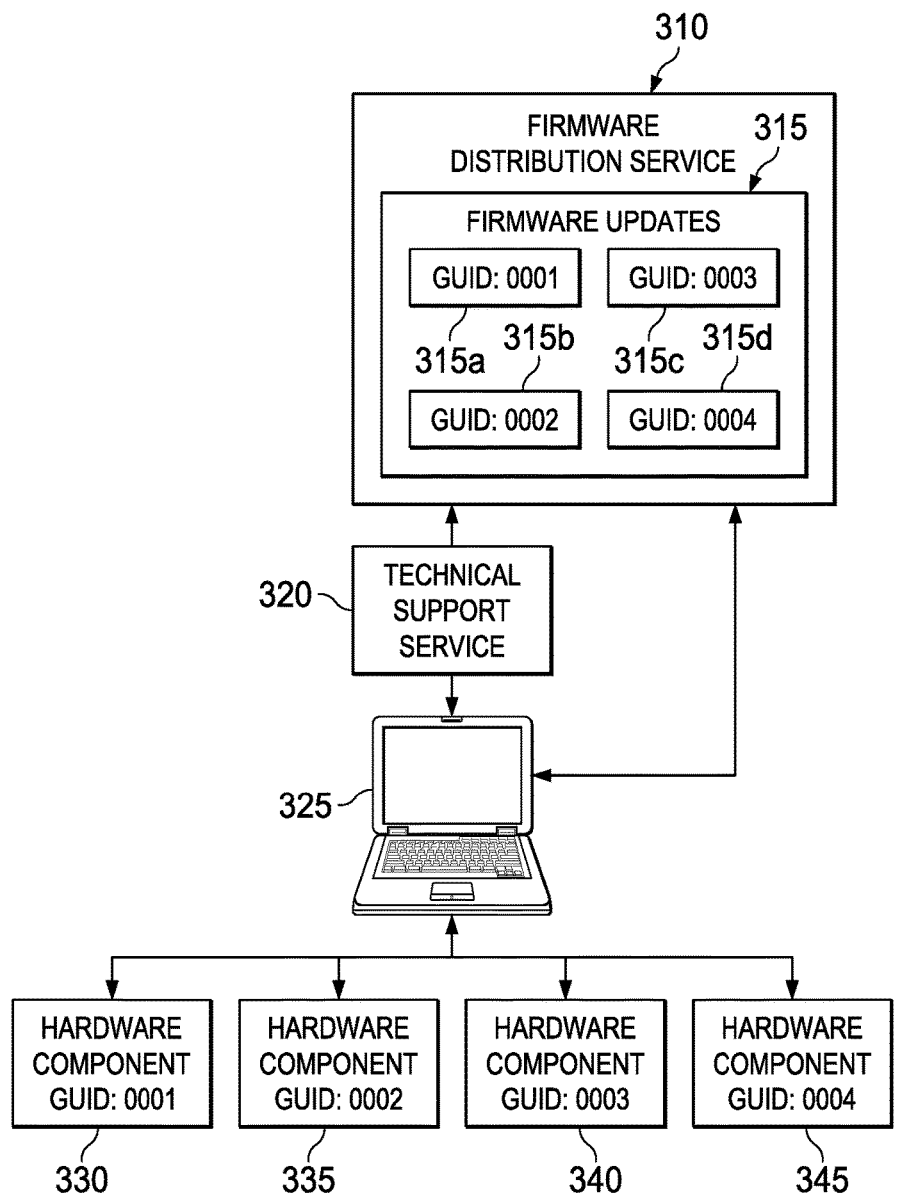
FIG. 3 is a block diagram depicting certain components of a system for pushing firmware updates to an IHS.

FIG. 3 illustrates certain aspects of a system that may be used to provide firmware updates to components of an IHS. In the illustrated system, firmware updates are provided to laptop computer 325. In other scenarios, the system of FIG. 3 may be used to provide firmware updates to other types of IHSs that are configured to interoperate with the firmware distribution service 310. The laptop computer 325 includes four hardware components 330, 335, 340 and 350, where the operation of each of these four hardware components is determined based on a firmware program that is stored in a memory that is integral to the respective hardware component. Initially, the firmware program that is used for each of the hardware components is loaded during the manufacture and assembly of the laptop computer 325 or during the manufacture and assembly of the respective hardware component.

Firmware distribution service 310 is configured to provide updates to the firmware used by the hardware components 330, 335, 340 and 350 of the laptop computer 325. Upon manufacture and assembly of the laptop computer 325, the laptop may be sold and delivered. Once in use, the firmware used by each of the hardware components 330, 335, 340 and 350 may occasionally require updating. As described above, updating the firmware of a hardware component may be necessary in order to address defects (that may be in either the hardware or the software of the component), to take advantage of new functionality provided by the updated firmware and/or to provide compatibility with other systems. Organizations that manage and administer large numbers of IHSs such as laptop computer 325 may prefer a capability for providing such firmware updates to these IHSs s in an automated fashion.

During the manufacture of laptop computer 325, a unique identifier may be provided for each firmware program that has been configured for updating via the firmware distribution service 310. For instance, hardware component 330 includes an integral memory that is used to store firmware instructions that are used in the operation of this component. In various scenarios, hardware component 330 may be a standard component such as a NIC (Network Interface Controller) card or a more specialized component such as a bar code scanning device. Similarly, hardware components 335, 340 and 350 utilize locally-stored firmware instructions and may comprise a wide variety of devices that are configured to interoperate with laptop computer 325. The firmware distribution service 310 is configured to support the updating of the firmware utilized by each of these hardware components 330, 335, 340 and 350.

In order to properly route the correct firmware updates to the correct hardware component, the system of FIG. 3 utilizes a global unique identifier (GUID) that is assigned to each hardware component. In the illustrated example, hardware component 330 has been assigned GUID 0001. Likewise, hardware component 335 has been assigned GUID 0002, hardware component 340 has been assigned GUID 0003 and hardware component 345 has been assigned GUI 0004. In certain scenarios, these GUIDs are assigned during the assembly of these hardware components to laptop computer 325, which is typically during the manufacture of laptop computer 325. The GUIDs may thus be assigned by the manufacturer of the laptop computer 325.

In certain cases, the manufacturer of the laptop computer 325 may also provide the purchaser of the laptop computer 325 with technical support services 320, which may include providing the purchaser of the laptop computer 325 with any updates to the firmware for any number of the hardware components 330, 335, 340 and 350 that were installed during the assembly of the laptop computer 325. In certain scenarios, the manufacturer of an IHS, such as laptop computer 325, may be distinct from the entity providing technical support 320 for the IHS. In such scenarios, the manufacturer of the IHS may assign GUIDs to the installed hardware components. Once the IHS is sold, the assigned GUIDs may be transferred to a distinct entity that provides technical support 320 for the deployed IHSs, including providing firmware updates for the hardware components used by the IHS.

In the illustrated scenario, the manufacturer of the laptop computer 325 assigns GUIDs to each of the hardware components 330, 335, 340 and 350 that are installed during assembly of the laptop. Once the laptop computer 325 has been sold and deployed, the manufacturer also provides technical support 320 for the laptop computer 325, including providing updated firmware for the hardware components that were assigned GUIDs during the manufacture of the laptop computer 325.

The firmware support service 305 may be configured to track information regarding the firmware versions in use by the hardware components 330, 335, 340 and 350. This information may be provided as manual inputs to the firmware support service 305 by administrators tasked with providing support for the laptop computer 325, and more particularly tasked with determining when particular firmware upgrades should be provided to the laptop computer 325 via the firmware distribution server 310. In certain scenarios, these firmware upgrade determinations may be provided by external systems. In certain other scenarios, the upgrade determinations may be determined by the firmware support service 305 utilizing automated processes that operate with human supervision.

Based on these firmware upgrade determinations, a firmware upgrade is initiated by the technical support service 320 querying the firmware support service 310 for updated firmware for the hardware components 330, 335, 340 and 345 of the laptop computer 325. In certain scenarios, the technical support service 320 provides the firmware distribution service 310 with a listing of firmware updates 315 to be made available. In such scenarios, this listing of the firmware updates to be provided is used by the firmware distribution service 310 to identify the correct versions of the firmware files to be pushed to the laptop computer 325. In some of these scenarios, the firmware distribution service 310 may identify these firmware files within a database of authenticated firmware updates that have been approved for potential distribution by the firmware distribution service 310. Consequently, the actual firmware update files may be stored and retrieved as necessary from a repository of authenticated firmware updates that are available for distribution.

In certain scenarios, the firmware updates that are made available by the firmware distribution service 310 may be retrieved from a repository, that may be maintained by the manufacturer of the laptop computer 325. In other scenarios, the technical support service 320 is used to provide the firmware updates 315a-d to the firmware distribution service 310. For instance, BIOS firmware updates for the laptop computer 325 may be provided by the manufacturer via the technical support service 320. In other scenarios, the firmware distribution service 310 receives the firmware update 315 files from third parties that provide firmware support services. For instance, firmware updates 315 may be provided by vendors or other organizations that provide support each of the individual hardware components 330, 335, 340, 345. In one such scenario, firmware update 315a may be an update to the firmware of a NIC card. In that case, the firmware update 315a may be provided by the manufacturer of the NIC card, or another entity supporting the NIC card.

The technical support service 320 is configured to distribute firmware updates 315 to the laptop computer 325. The technical support service 320 will be further configured to similarly provide firmware updates to additional devices that have been configured to interoperate with the firmware distribution service 310. In certain scenarios, the laptop computer 325 may be configured to periodically query the firmware distribution service 310 to determine whether new firmware updates have been made available to the laptop computer 325. In certain of such scenarios, the laptop computer 325 may be configured to provide a listing of firmware that is currently being utilized by the laptop. In the illustrated example, the firmware listing provided by the laptop computer 325 includes the firmware for each of the four hardware components 330, 335, 340 and 350, where the firmware resources are identified as GUID 0001, GUID 0002, GUID 0003 and GUID 0004, respectively.

Upon receiving this listing of firmware from the laptop computer 325, the firmware distribution service 310 uses the GUIDs provided in this listing to determine whether updates are available for any of the firmware reported by the laptop computer 325. More specifically, the firmware distribution service 310 compares the GUIDs in the firmware listing reported by the laptop computer 325 against the GUIDs for the firmware updates 315 that have been made available based on the direction of the technical support service 320 that is tasked with supporting the laptop computer 325. If a GUID from the firmware report is matched to the GUID of an available firmware update, this firmware update may be pushed to the laptop computer 325 by the firmware distribution service 310. In this manner, the firmware distribution service 310 may be used to distribute firmware updates to large numbers of supported IHSs that may vary greatly with regard to the firmware that is utilized by each supported IHS.

In certain scenarios, the firmware distribution service 310 may be operated by the provider of the operating system that is utilized by the laptop computer 325. Accordingly, in some scenarios where the laptop computer 325 uses a WINDOWS operating system, the firmware distribution service 310 may be provided by MICROSOFT, the organization that makes and supports this operating system. In such scenarios, the firmware distribution service 310 may be provided as a component of the Windows Update (WU) software update service. In certain scenarios where the laptop computer 325 uses a LINUX operating system, the firmware distribution service 310 may be provided by the maintainers of the Linux Vendor Firmware Service (LVFS).

Figure 4:
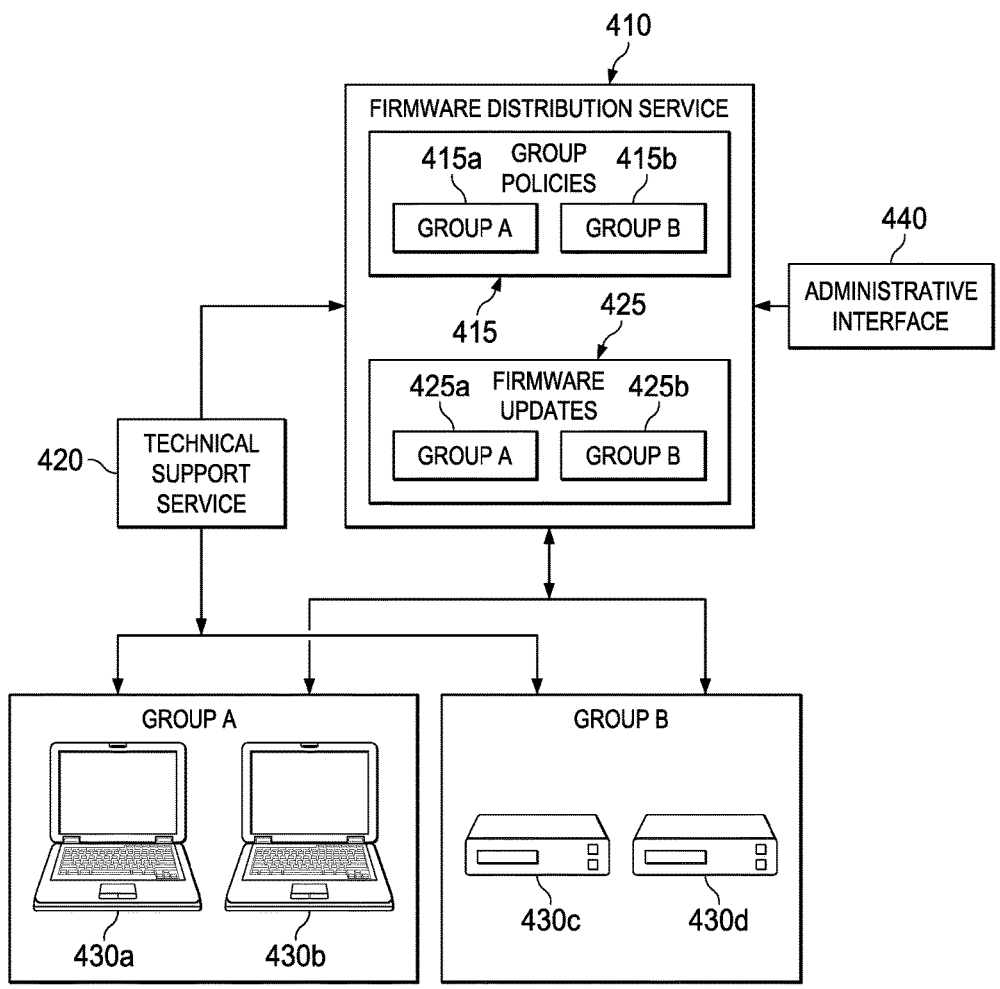
FIG. 4 is a block diagram depicting certain components of another system for pushing firmware updates to groups of IHSs.

FIG. 4 illustrates certain aspects of another technique by which the system of FIG. 3 that may be used to provide firmware updates to components of a multiple IHSs that have been organized into groups. In the example of FIG. 3, firmware updates are being provided to a single laptop computer 325 via a firmware distribution service 310 that distributes firmware updates based on the GUID of each of the firmware programs utilized by the laptop computer 325. However, in many scenarios, organizations prefer to manage the administration and support of IHSs in logical groups. This preference becomes more imperative as the number of IHSs that are being managed grows. One such grouping may be according to the type of IHS (e.g., DELL Inspiron laptop). Other groupings may be according to various other criteria such as the geographic location of the IHS, the business function being served by the IHS, the specific software and/or hardware being used via the IHS. By grouping the IHSs, their management is simplified by enacting group policies 425 that provide for uniform administration of all the IHSs that comprise a group.

Similar to the system of FIG. 3, the firmware distribution service 410 receives firmware update information a technical support service 420. This firmware update information received from the technical support service 420 may include firmware update files or may instead include a manifest listing the firmware update files to be made available by the firmware support service 405. Also similar to the system of FIG. 3, technical support service 420 provides firmware update information to the firmware distribution service 410 on behalf of an organization that provides support for four IHSs 430*a-d*. However, instead of relying on GUIDs to identify a specific firmware to be updated, firmware updates are specified by grouping the IHSs and associating a group policy 415 for updating all of the IHSs in the group.

In some scenarios, these groupings of IHSs are specified by an IT administrator manually configuring the groups via an administrative interface 440 provided by the firmware distribution service 410. In certain of such scenarios, the administrative interface 440 is a graphical interface that allows an IT administrator with the ability to specify the individual IHSs that comprise each of the groups. For instance, in the illustrated example, the administrative interface 440 is used to specify that IHSs 430*a* and 430*b* are in Group A and IHSs 430*c* and 430*d* are in Group B. In addition, the administrative interface is used to specify group policies 415 for each of the groups. The administrative interface 440 may further include various additional features for administering the firmware distribution service 410.

Upon receiving an indication from the technical support service 420 of a firmware update for a particular group of IHSs, the firmware distribution service 410 provides firmware updates to each of the IHSs in the specified group. The technical support service 420 may provide the firmware distribution service 410 with a manifest that specifies a new set of firmware updates that are to be made available to the IHSs of a particular group. In the illustrated system, for example, a manifest provided by the technical support service 420 may indicate that new firmware is available for the IHSs 430*a-b* that have been specified as belonging to Group A. This manifest may also specify the specific firmware files to be provided to the IHSs of Group A. The firmware distribution service 410 receives this information and locates the firmware update files 425*a* to be made available to the IHS of Group A. Upon receiving an update query from one of the Group A supported IHSs 430*a-b*, the firmware distribution service 410 first determines the applicable group policy 415*a* for the querying IHS. Based on this group policy 415*a*, the firmware distribution service 410 identifies the corresponding firmware update 425*a* for Group A and makes these files available to the querying IHS. However, if an update query is received from one of the Group B IHSs, the querying IHS is notified that no new firmware updates are presently available for Group B. In this manner, the firmware distribution service 410 may be used to manage the uniform distribution of firmware to groups of supported IHSs.

In some scenarios, the firmware distribution service 410 may still utilize GUIDs in supporting the distribution of firmware updates to groups of supported IHSs. For instance, the technical support service 420 may still specify the firmware updates to be associated with a particular group policy using GUIDs. But, the GUIDs are not used, as in FIG. 3, to determine which firmware updates to provide to a particular IHS. Instead, according to a policy specified for an IHS grouping, all IHSs in a grouping are provided the same set of firmware updates. Similar to the system of FIG. 3, any portion of the actual firmware updates files 425 that are made available by the firmware distribution service 410 may be provided directly by the technical support service 420 or any portion of the firmware update files 425 may instead be provided to the firmware distribution service 410 by third parties.

In the scenario illustrated in FIG. 4, the use of these groupings requires that the firmware distribution service 410 be provided the groupings of IHSs and the corresponding policies that are to be used in order to distribute uniform software updates to all of the IHSs in a group. Consequently, in some scenarios, this also requires providing this grouping and policy information to the firmware distribution service 410 in a manner that is supported by the firmware distribution service 410. However, the firmware distribution service 410 may provide limited capabilities for configuring these groupings and policies.

Such limitations on the use of groupings may be unacceptable in certain scenarios. For instance, in certain scenarios, the firmware distribution service 410 may support only non-hierarchical groupings. The inability to utilize nested groups of supported IHSs may be limiting to certain organizations that manage and administer large groups of IHSs. For example, a large organization supporting a large number of IHSs that all utilize the same hardware may wish to apply uniform firmware updates to all of these IHSs. However, an organization may additionally prefer to deploy these updates in groups that are based on the geographic regions of the supported IHSs. When using the system of FIG. 4 that does not include any ability to provide nested groups of IHSs, such organizations must manually configure and administer each of these geographic groups of computers in order to utilize these geographic groupings. As such, organizations may determine that the capabilities provided for specifying groups of IHSs may be unacceptably limiting in a system such as illustrated in FIG. 4.

In addition to being limited by the grouping capabilities that may be provided by the firmware distribution service 410, organizations may also prefer a mechanism for controlling group memberships without having to rely on the firmware distribution service 410 to provide acceptable interfaces for establishing and editing these groups. For instance, organizations managing large groups of IHSs may prefer to utilize scripts or other automated tools for making changes to group memberships rather than be forced to utilize manual interfaces provided by the firmware distribution service 410 that may be conducive to operator error. If IHS groupings are maintained by the firmware distribution service 410, organizations must rely on the capabilities provided by the firmware distribution service 410 for diagnosing and repairing configuration errors. Accordingly, organizations may prefer the ability to control the groupings used for firmware updates themselves without relying on the firmware distribution service 410.

Figure 5:
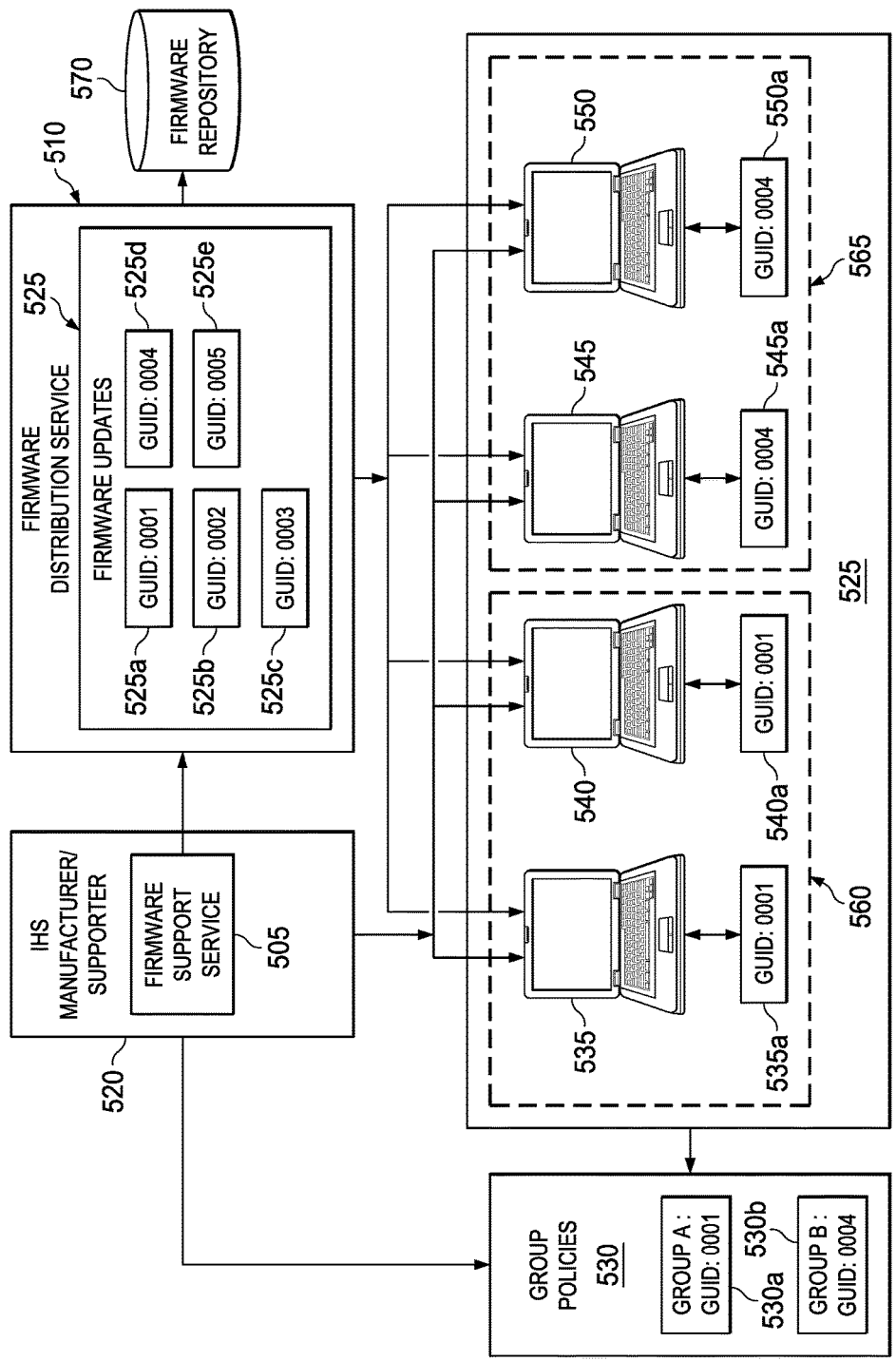
FIG. 5 is a block diagram of a system according to various embodiments for distributing firmware to a plurality of supported IHSs.

FIG. 5 illustrates a system according to various embodiments that distributes firmware updates to groups 560 and 565 of supported IHSs 535, 540, 545 and 550 that are all managed by organization 525. In addition, the groups 560 and 656 are configured and managed by the organization 525 separate from the firmware distribution service 510. The organization 525 utilizes the GUID routing mechanism provided by the firmware distribution service 510 in order to deliver firmware updates to the supported IHSs 535, 540, 545 and 550. However, the organization 525 does not rely on the grouping capabilities of the firmware distribution service 510 that may be available for use in deliver different versions of a firmware update to different groups of IHSs within a set of IHSs that are being managed by an organization. As described, in many cases, the grouping capabilities provided by a firmware distribution service 510 may be limited and burdensome for organizations managing large numbers of IHSs. Accordingly, the firmware support service 505 provides capabilities for configuring and managing logical groups of IHSs as separate firmware support groups, where firmware updates can be directed to the member IHSs of a specific firmware support group, while still utilizing the GUID routing capabilities of the firmware distribution service 510.

In the illustrated embodiment, the firmware support service 505 is provided to the organization 525 by the manufacturer 520 of the supported IHSs 535, 540, 545 and 550. In some scenarios, the manufacturer 520 provides this firmware support via a technical support agreement with the organization 525. In certain other embodiments, the technical supporter 520 of the IHSs 535, 540, 545 and 550 may be a company, distinct from the manufacturer, that is tasked by the organization 520 with providing technical support to the users of the supported IHSs 535, 540, 545 and 550 once these supported IHSs have been sold and delivered. In particular, the support provided by the technical supporter 520 includes providing firmware updates to the supported IHSs 535, 540, 545 and 550. In certain embodiments, the organization 525 may be comprised of multiple different organizations. These different organizations may interoperate to perform different aspects of the management of the supported IHSs 535, 540, 545 and 550, or these different organizations may succeed each other in supporting the IHSs 535, 540, 545 and 550.

As illustrated in FIG. 5, embodiments provide the ability for an organization 525 managing a set of supported IHSs 535, 540, 545 and 550 to logically group these supported IHSs within firmware update groups. A firmware update group may be used by the organization 525 in order to specify a group of IHSs to which firmware updates are to be applied uniformly by the firmware support service 505 according the a firmware update policy 530 that is associated with the group of IHSs. Importantly, embodiments provide the ability to configure these firmware update groupings independently from the firmware distribution service 510 that is being relied upon to actually deliver the firmware updates to the supported IHSs 535, 540, 545 and 550.

In the embodiment of FIG. 5, the firmware distribution service 510 receives firmware update information from the firmware support service 505. In certain embodiments, the firmware support service 505 provides actual firmware update files 525a-e to the firmware distribution service 510. In other embodiments, the firmware support service 505 provides a manifest listing the firmware update files 525a-e to be made available by the firmware distribution service 510. In such embodiments, the firmware distribution service 510 may be configured to inspect the manifest provided by the firmware support service 505 and further configured to locate the firmware update files 525a-d that are to be made available. The firmware distribution service 510 may retrieve authenticated or otherwise verified firmware update files 525 from one or more repositories 570 that provide access to various firmware update files.

A portion of the firmware update files that are available in a repository 570 may be uploaded to the repository 570 by companies that sell and/or support the hardware components to which the firmware applies. For instance, a company that sells and supports a hard disk storage drive may periodically make a firmware update available that provides updated functionality and/or addresses errors in the hard disk storage drive. In some scenarios, a portion of the firmware updates files may be uploaded to the repository 570 by open-source software collectives. Once the organization 525 has determined that the updated firmware should be deployed to a particular group of supported IHSs, this may be communicated to firmware support service 505, which may then post firmware update information, such as a manifest identifying the firmware update files to be located and provided, to the firmware distribution service 510. In some scenarios, a portion of the firmware update files may be uploaded to the repository by the manufacturer 520 of the supported IHSs 535, 540, 545 and 550.

In the illustrated embodiment, the firmware support service 505 provides firmware updates for the supported IHSs 535, 540, 545 and 550 on behalf of the organization 525 that manages these IHSs. In this illustrated embodiment, the supported IHSs 535, 540, 545 and 550 are all laptop computers. In other embodiments, the supported IHSs may include various different types of IHSs that are configured to utilize the firmware distribution service 510. In the illustrated embodiment, the IHSs 535, 540, 545 and 550 are being supported by the manufacturer 520 of all of the IHSs. In order to support distribution of firmware updates to the supported IHSs 535, 540, 545 and 550, the manufacturer 520 may configure each the supported IHSs 535, 540, 545 and 550 with a GUID during the manufacture and assembly of each of the IHSs. This process of assigning GUIDs to the supported IHSs 535, 540, 545 and 550 is described in additional detail with respect to FIG. 6.

In the system of FIG. 5, each of the supported IHSs 535, 540, 545 and 550 is assigned a GUID during the manufacture and/or assembly of these IHSs, where this GUID is determined based on a technical support categorization for each of these IHSs that is managed by the organization 525. Multiple supported IHSs may be assigned the same GUID. In the illustrated embodiment, supported IHSs 535 and 540 have both been assigned GUIDs 0001 during the manufacture of these devices, while supported IHSs 545 and 550 have been assigned GUIDs 0004. By virtue of these GUID assignments by the manufacturer 520, the four supported IHSs 535, 540, 545 and 550 have been separated into two firmware support groups, with supported IHSs 535 and 540 in a one group 560 and supported IHSs 545 and 550 in a separate group 565.

In addition to encoding grouping information, these GUIDS utilized by the firmware support service 505 are also used for routing the firmware updates to the supported IHSs 535, 540, 545 and 550 via the firmware distribution service 510. Thus, the manufacturer 520 of the supported IHSs 535, 540, 545 and 550 may encode each of these IHSs with a GUID that will be used for distribution of firmware updates to each of the devices and, in addition, the manufacturer 520 may assign these GUIDs in a manner that creates groups of IHSs. As described above, organizations supporting large numbers of IHSs may prefer to administer at least certain aspects of these IHSs as logical groups of IHSs. BIOS firmware updates, for instance, tend to require thorough testing prior to deployment such that organizations may prefer to defer certain BIOS updates due to incompatibilities with legacy systems.

Large organizations may manage many different types of IHSs with varying constraints that may require delaying or deferring firmware updates for certain types of IHSs. This may be particularly true for BIOS firmware updates that can cause far-reaching problems with respect to the basic functions of the IHSs, in which case these updates may be deployed by an organization only after thorough evaluation of the impact of the update. In certain scenarios, the unique nature of BIOS firmware updates may also result in organizations requiring firmware update groups only for BIOS firmware updates, with all other firmware updates managed via default policies. Accordingly, in such scenarios, embodiments provide an organization 525 with the ability to control the delivery of firmware updates to the supported IHSs 535, 540, 545 and 550 from the time each IHS is manufactured and, also without the organization 525 having to perform any configuration of firmware updates via the firmware distribution service 510. By configuring the supported IHSs 535, 540, 545 and 550 into firmware update groups at the time of the supported IHSs are manufactured, the risk of inadvertent, malicious or ill-advised firmware updates by users of the supported IHSs 535, 540, 545 and 550 is greatly reduced.

An organization 525 managing a group of IHSs 535, 540, 545 and 550 may thus prefer a convenient mechanism for controlling the distribution of firmware updates to groups of supported IHSs without having to configure and manage the IHSs grouping with the firmware distribution service 510. In the illustrated scenario, an organization 525 has ordered the four supported IHSs 535, 540, 545 and 550 from the manufacturer 520, which will also provide post-sale firmware update support for these IHSs once they have been delivered and deployed. The organization 525 has specified that IHSs 535 and 540 are to be logically grouped together as part of one firmware update group 560 and IHSs 545 and 550 are to be logically grouped together as part of a separate firmware update group 565.

In some scenarios, the organization 525 may request specific IHS groupings that are selected in order to facilitate administration of these IHSs. For instance, the organization 525 may identify IHSs 535 and 540 as members of one group 560 based on the planned delivery of these IHSs to users located in west coast offices of the organization 525 and may identify IHSs 545 and 550 as members of another group based on the planned delivery of these IHSs to users in the east coast offices of the organization 525. In such a scenario, the four supported IHSs 535, 540, 545 and 550 may be identical and may utilize identical firmware throughout, but may segregated into separate geographic firmware update groups in order to facilitate certain aspects of the administration of these devise.

In certain embodiments, the supported IHSs 535, 540, 545 and 550 may vary with respect to their hardware components, such that compatibility with certain firmware updates may vary based on the hardware components of a particular IHS. In such scenarios, the organization 525 may specify groupings that reflect such differences between the hardware of the supported IHSs 535, 540, 545 and 550. For instance, IHSs that include a biometric fingerprint scanner may be placed in a separate group due to specialized administrative processes that are required in order to update the firmware of the fingerprint scanner, or in order to update the BIOS of the IHS without affecting the operation of the biometric fingerprint scanner. In other scenarios, the organization 525 may determine IHS groupings based on the computer systems or external hardware that an IHS is intended to interface with. For instance, supported IHSs may interface with legacy systems that provide critical business functions such that an organization 525 may require a separate firmware upgrade group for which upgrades are deployed based on the ability of these IHSs to interface with the legacy systems. In addition to these examples, an organization 525 may utilize a wide variety of criteria for grouping the supported IHSs 535, 540, 545 and 550.

In some scenarios, grouping determinations for the supported IHSs 535, 540, 545 and 550 may be made by the manufacturer 520 with minimal input from the organization 525 that will receive and manage these supported IHSs. For instance, the manufacturer 520 may generate the IHS groupings based on an indication from the organization 525 that different IHS platforms are to be segregated into different groups. With reference to the illustrated embodiment, the manufacturer 520 may place IHSs 535 and 540 in one group 560 based on both of these IHSs being laptop computers of the same family (e.g., DELL Inspiron laptops) and IHSs 545 and 550 may be placed in another group 565 based on both of these IHSs being laptops from a different family (e.g., DELL Precision laptops).

In other scenarios, the manufacturer 520 may establish these IHS groupings based on more specific details about the supported IHSs 535, 540, 545 and 550. For instance, the manufacturer 520 may place IHSs 535 and 540 in a one group 560 based on both of these IHSs being laptop computers of the same family and that also both utilize the same BIOS version (e.g., DELL Inspiron laptops, both using BIOS version 1.2.1) and IHSs 545 and 550 may be placed in another group 565 based on both of these IHSs being laptops of the same family but both utilizing a different BIOS version (e.g., DELL Inspiron laptops, both using BIOS version 1.3.0). In this manner, the distribution of BIOS firmware updates can be controlled by the organization 525 for any group of IHSs such that the newest BIOS firmware can be pushed immediately to certain IHSs managed by the organization 525, while other IHSs may continue to operate without upgrading to the new version of the BIOS. Other embodiments may utilize various other criteria for grouping the supported IHSs. In many embodiments, the IHS groupings will be configured in a manner that promotes the ability of an organization 525 to control the distribution of firmware updates to the supported IHSs 535, 540, 545 and 550.

As illustrated in FIG. 5, embodiments utilize GUIDs for distributing firmware updates to groups of supported IHSs 535, 540, 545 and 550. However, unlike the system of FIG. 4, the firmware distribution service 510 is not used to configure these groupings. In certain embodiments, the firmware distribution service 510 may not even be aware of these groupings. Rather than rely on the grouping capabilities provided by the firmware distribution service 510, embodiments provide the organization 525 with the ability to select and manage groupings and associated firmware update policies 530. Consequently, IHS groupings may be configured without the attendant limitations of the capabilities for created and managing groups that are provided by the firmware distribution service 510. In certain embodiments, the organization 525 may track and maintain the IHSs groupings. An organization 525 supporting a large number of IHSs may generate many groupings and may utilize complex structures for organizing these groupings. In certain embodiments, capabilities for configuring and managing complex structures of IHS groups may instead be provided to the organization 525 by the firmware support service 505. By configuring and managing the IHS groupings independent from the firmware distribution service 510, complex structures of IHS groups can be utilized. In particular, hierarchical, nested groups of IHSs may be configured. In addition, structures in which individual IHSs may be members of multiple different firmware update groups may be configured. Embodiments provide the organization 525 with the ability to generate any structure of IHS groups that can be mapped to a set of GUIDs, where these GUIDs can in turn be used to trigger the firmware distribution service 510 to make the correct firmware updates available to each of the supported IHSs 535, 540, 545 and 550 based on the group to which each IHS has assigned.

Figure 6:
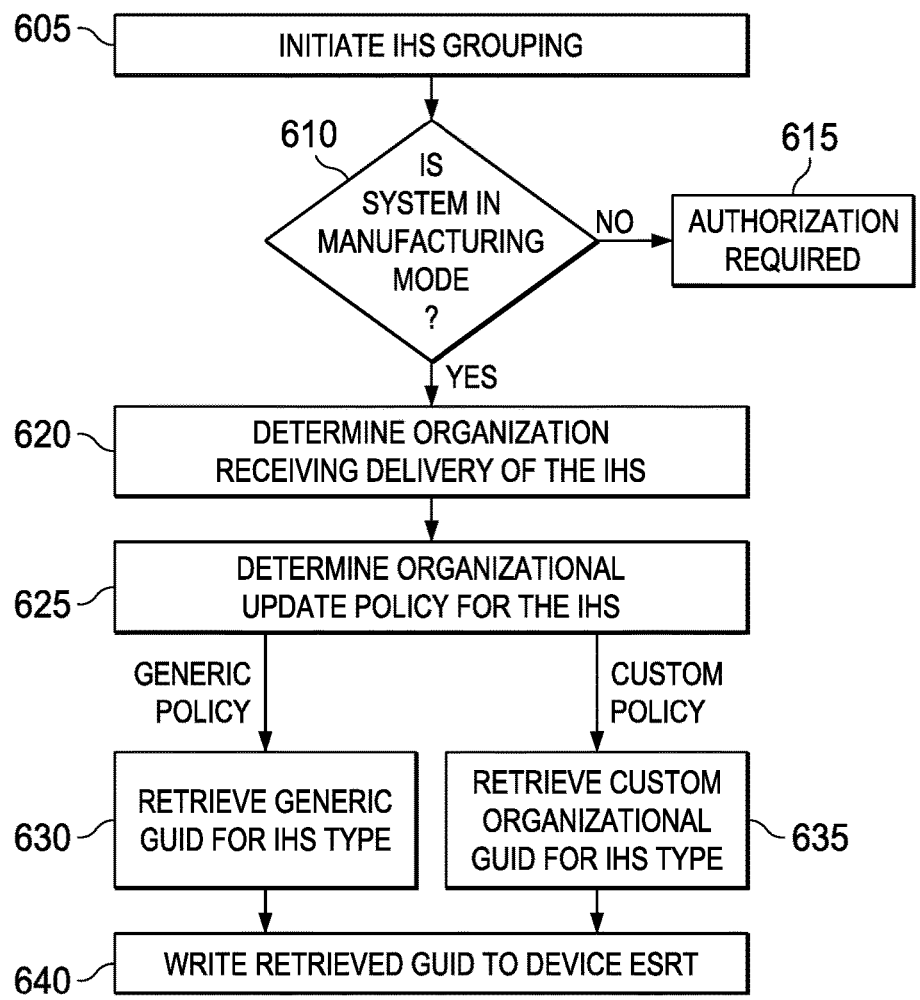
FIG. 6 is flowchart depicting certain steps of a method for configuring the GUID of an IHS.

FIG. 6 illustrates certain steps of a method according to various embodiments for distributing firmware updates to a collection of supported IHSs that are managed by an organization. The illustrated process begins at step 605 with the receipt of a request to configure an IHS as a member of a firmware support group. Before initiating the configuration of an IHS as a member of a firmware update group, at step 610, the group configuration system first determines whether the IHS is presently in a manufacturing stage. If the IHS is not presently being manufactured and/or assembled, at step 615, authorization to configure the group assignment of the IHS may be requested. In certain embodiments, establishing an authenticated session with the IHS may be required in order to modify the group assignment of an IHS. Modification of group assignments in this manner may be required in order to transfer ownership of an IHS, installation of a new operating system for use by an IHS or to move a supported IHS between different firmware support groups.

In certain embodiments, the firmware support service may be configured to receive requests to modify the firmware support group of an IHS. For instance, a change to the hardware of an IHS may allow less restrictive updates to the firmware of an IHS. In other scenarios, a change in the user of an IHS may require a change to the firmware update group of the IHS. In certain embodiments, the organization may specify the firmware update group to which the IHS should be transferred. In other embodiments, the organization may specify the changes made to the IHS such that the new firmware update group can be determined by the firmware support service 505. In certain scenarios, the firmware support service 505 may assign the IHS to an existing firmware support group and in other scenarios, a new firmware support group may be created for the IHS.

If an IHS is presently in a manufacturing stage when the request to configure the grouping of the IHS, a GUID may be used to configure the IHSs as a member of a particular group. At step 620, the organization that will receiving delivery of the IHs is determined. The GUID that is used may be determined based on the organization that will be receiving delivery of the IHS once its manufacture is complete. The GUID may also be determined based on an update policy that is associated with the IHS to be configured. As described above, an organization may specify the configuration of IHS groups by specifying the use of different groups for different platforms or for the use of different BIOS versions within the same platform. Any such policies pertain to the IHS are determined and consulted at step 325 in order to determine the applicable firmware update policy for an IHS.

If the firmware update policy that applies to an IHS indicates that the IHS is a member of a default administration grouping, at step 630, a corresponding generic GUID is determined for the IHS. In such situations, a generic GUID may provide a default set of firmware update settings that are applicable if no organizational update policy has been specified for the IHS. This generic GUID serves to identify a default grouping of IHSs managed by the organization, where default firmware update policies are utilized with respect this default grouping. Instead, if a specific grouping is indicated by the organization, at step 635 a GUID that corresponds to the grouping is retrieved for the IHS. At step 640, the GUID is written to a dedicated memory location maintained by the IHS, where this memory location can only be edited during manufacturing mode or by an IT administrator during an authenticated session. In certain embodiments, GUID is written to an ESRT (EFI System Resource Table) table that is maintained by an IHS. In certain embodiments, the GUID may be encoded as registry setting of an IHS. Once configured with a GUID, the IHS may then interface with the firmware distribution service to issue a query for possible firmware updates that have been made available to the IHS. In certain embodiments, the IHS provides its ESRT, which includes the GUID assigned to the IHS, to the firmware distribution service. In such embodiments, the matching of GUIDs in the ESRT table of the IHS and the GUIDs used to identify the firmware updates provided by the firmware distribution service 510 is used to determine whether the firmware update should be pushed to the IHS.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A system for distributing firmware updates, comprising:
one or more processors; and
a memory device coupled to the one or more processor, the memory device storing computer-readable instructions that, upon execution by the one or more processors, cause the system to:
receive a categorization for a plurality of IHSs (Information Handling Systems), wherein the categorization is received from an organization prior to manufacture of the plurality of IHSs;
determine a GUID (Global Unique Identifier) corresponding to the received categorization, wherein the GUID assigns each of the plurality of IHSs to a firmware update group;
encode each of the plurality of IHSs with the determined GUID, wherein the GUID is encoded during the manufacture of each of the plurality of IHSs; and
post one or more updated firmware programs to a firmware distribution service for delivery to the firmware update group, wherein the one or more updated firmware programs are delivered to a first IHS of the plurality of IHSs if the first IHS is encoded with the GUID.

2. The system of claim 1, wherein the categorization of the plurality of IHSs indicates that firmware updates are to be administered uniformly by each of each of the plurality of IHSs.

3. The system of claim 2, wherein the categorization indicates that each of the plurality of IHSs operates using the same version of a BIOS (Basic Input/Output System) firmware program.

4. The system of claim 3, wherein the one or more firmware programs comprise an update to the BIOS firmware of each of the plurality of IHSs.

5. The system of claim 1, the memory device storing additional computer-readable instructions that, upon execution by the one or more processors, further cause the system to:
receive a request to modify the categorization of one or more of the plurality of IHSs;
determine a second GUID based on the received modification, wherein the second GUID corresponds to a second categorization of the one or more of the plurality of IHSs;
establish a secure connection to each of the one or more of the plurality of IHSs; and
encode each of the one or more of the plurality of IHSs with the second GUID.

6. The system of claim 5, wherein the second GUID is retrieved from a repository of GUIDs based on the modified categorization, and wherein the second GUID identifies the one or more of the plurality of IHSs as members of a second firmware update group.

7. The system of claim 3, the memory device storing additional computer-readable instructions that, upon execution by the one or more processors, further cause the system to:
determine whether to deliver one or more firmware updates to each of the plurality of IHSs, wherein the determination is made based on the GUID encoded by each of the plurality of IHSs.

8. The system of claim 1, wherein each of the plurality of IHSs is encoded with the GUID by editing the registry of each of the plurality of IHSs.

9. The system of claim 1, wherein the categorization of the plurality of IHSs is specified in an order for the manufacture of the plurality of IHSs.

10. The system of claim 1, the memory device storing additional computer-readable instructions that, upon execution by the one or more processors, further cause the system to:
receive a request to modify the categorization for the plurality of IHSs; and
assign the GUID encoded by the plurality of IHSs to a third firmware update group corresponding to the modified categorization.

11. A method for distributing firmware updates, the method comprising:
receiving a categorization for a plurality of IHSs (Information Handling Systems), wherein the categorization is received from an organization prior to manufacture of the plurality of IHSs;
determining a GUID (Global Unique Identifier) corresponding to the received categorization, wherein the GUID assigns each of the plurality of IHSs to a firmware update group;
encoding each of the plurality of IHSs with the determined GUID, wherein the GUID is encoded during the manufacture of each of the plurality of IHSs; and
posting one or more updated firmware programs to a firmware distribution service for delivery to each of the plurality of IHSs, wherein the one or more updated firmware programs are delivered to a first IHS of the plurality of IHSs if the first IHS is encoded with the GUID.

12. The method of claim 11, wherein the categorization of the plurality of IHSs indicates that firmware updates are to be administered uniformly by each of each of the plurality of IHSs.

13. The method of claim 12, wherein each of the plurality of IHSs operates using the same version of a BIOS (Basic Input/Output System) firmware program.

14. The method of claim 13, wherein the one or more firmware programs comprise an update to the BIOS firmware of each of the plurality of IHSs.

15. The method of claim 11, further comprising:
receiving a request to modify the categorization of one or more of the plurality of IHSs;
determining a second GUID based on the received modification, wherein the second GUID corresponds to a second categorization of the one or more of the plurality of IHSs;
establishing a secure connection to each of the one or more of the plurality of IHSs; and
encoding each of the one or more of the plurality of IHSs with the second GUID.

16. The method of claim 15, wherein the second GUID is retrieved from a repository of GUIDs based on the modified categorization, and wherein the second GUID identifies the one or more of the plurality of IHSs as members of a second firmware update group.

17. The method of claim 13, further comprising:
determining whether to deliver one or more firmware updates to each of the plurality of IHSs, wherein the determination is made based on the GUID encoded by each of the plurality of IHSs.

18. The method of claim 11, wherein each of the plurality of IHSs is encoded with the GUID by editing the registry of each of the plurality of IHSs.

19. The method of claim 11, wherein the categorization of the plurality of IHSs is specified in an order for the manufacture of the plurality of IHSs.

20. The method of claim 11, further comprising:
receiving a request to modify the categorization for the plurality of IHSs, and
assign the GUID encoded by the plurality of IHSs to a third firmware update group corresponding to the modified categorization.

\* \* \* \* \*